March 11, 1969     J. E. CURREY     3,432,422

CURRENT CONDUCTING MEMBERS FOR ELECTROLYTIC CELL

Filed Oct. 21, 1966

United States Patent Office 3,432,422
Patented Mar. 11, 1969

3,432,422
CURRENT CONDUCTING MEMBERS FOR
ELECTROLYTIC CELL
John E. Currey, Lewiston, N.Y., assignor to Hooker
Chemical Corporation, Niagara Falls, N.Y., a corporation of New York
Continuation-in-part of application Ser. No. 154,509,
Nov. 24, 1961. This application Oct. 21, 1966, Ser.
No. 588,620
U.S. Cl. 204—258                3 Claims
Int. Cl. B01k 3/00

ABSTRACT OF THE DISCLOSURE

Triangular shaped copper anode and/or cathode bus bars are provided for deposited diaphragm-type electrolytic cells for the electrolysis of alkali metal chloride brines. Slotted L-shaped inter-cell connecting bus bars are provided for horizontal and vertical alignment of adjacent cells. Likewise, more than one such inter-cell connection is made to each copper anode bus bar to provide for simplified removal of one cell from a series without the use of a conventional jumper bar.

---

Figure 1:
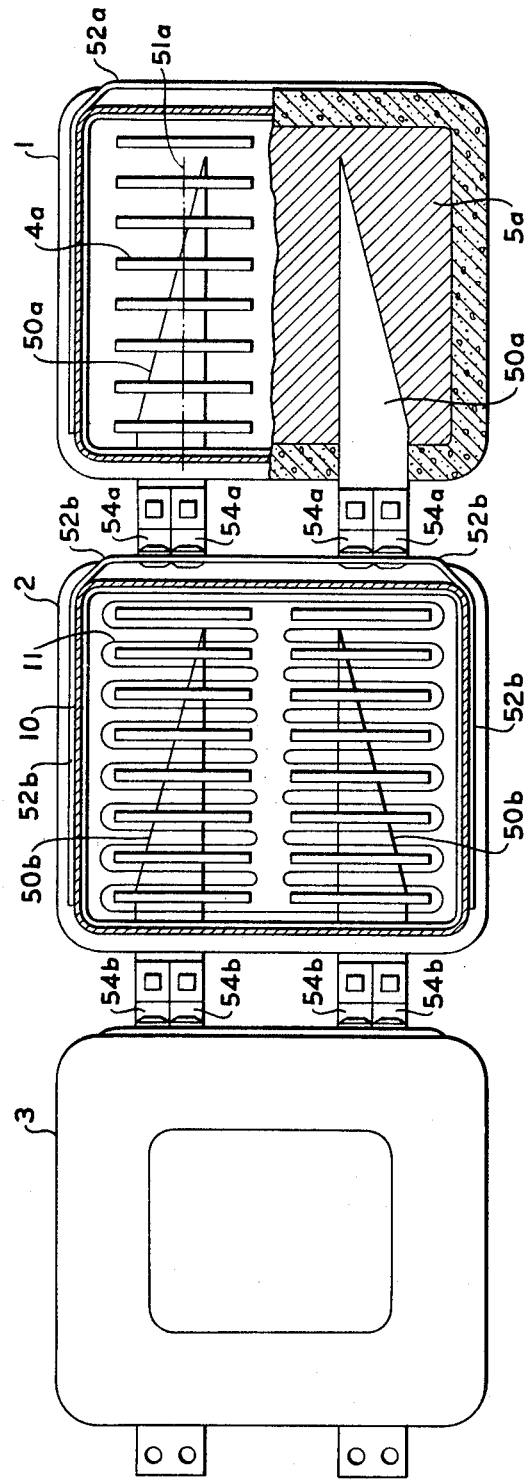

This is a continuation-in-part of Ser. No. 154,509, filed Nov. 24, 1961, and now abandoned.

This invention relates to improvements in the current conducting members used in deposited diaphragm electrolytic cells having vertical anodes positioned and connected in the base of the cell and having vertical cathode electrodes electrically connected to at least one side of said cell.

In the past, the electric current has been conducted from the anode structure of one deposited diaphragm cell to the cathode structure of the next adjacent cell by means of metallic current-carrying members, known as bus bars. The metal used is usually copper, but other conductive metals may be used. These deposited diaphragm electrolytic cells are used for the electrolysis of alkali metal chloride brine to produce alkali metal hydroxide, chlorine, and hydrogen. The cells are placed and connected in electrical series so that the current flows from the vertical graphite anode electrodes embedded in the base of a first cell down through the lead matrix around the bases of the anodes, out through the rectangular metallic anode bus bars below the anodes, through a jumper bar on one side of the cell, into L-shaped inter-cell conductors and then into the cathode bus bar of the adjacent second cell. The current is then conducted into the cathode structure of the second cell connected to its sidewalls. The cathode structure is a steel shell containing screen mesh fingers extending from the sidewalls and supported internally with corrugated steel sheet members running the length of each finger, which also carry the current from the shell to the mesh fingers. In some cathode structures for deposited diaphragm cells, the cathode fingers extend from opposite sides toward an anolyte downcomer space in the center of the cell, and in other cathode structures the cathode fingers extend in parallel rows from one sidewall to the opposite sidewall. The current then travels through the diaphragm deposited on the cathode fingers and electrolyte to the anodes of that second cell, where it passes through the anodes, through its lead matrix into its anode bus bar and out through its anode bus bars into the jumper bar, between that cell and another adjacent cell, and then into L-shaped inter-cell conductors into the cathode conductor of the adjacent third cell.

In passing from the anode of the first cell to the cathode of the second cell, the current passes outwardly from a low elevation in the anode bus bars in the first cell, inwardly along its jumper bar, upward through the L-shaped conductor bar, and then outwardly and horizontally along the cathode conductor of the second cell. Thus the current flow from the anode structure of the first cell to the cathode structure of the second cell has passed an indirect, lengthy and irregular path, and has gone through a number of junctions. This causes undesirable voltage drop losses which are major factors in the cost of operating the cell. Further, there is an undesirable generation of heat, and there are higher conductor metal investment costs.

In the anode structures of most types of deposited diaphragm cells, there are two anode bus bars in each cell. Each is rectangular in shape and aligned with the center line of a bank of anode electrodes arrayed overhead. During electrolysis, current density in these rectangular anodes conductor bars varies approximately linearly from a relatively low value at the innermost end of the anode bar to a relatively high value at the end of the anode bar extending out of the cell. The rectangular shape with a uniform cross-section was sized depending on the current density at the high current density end of the anode conductor bar adjacent to the inter-cell conductor. Since low current density necessitate higher investment costs, the cost of the metal at the innermost end has been unduly great and has not been offset by a corresponding reduction in power costs.

Likewise, in many types of deposited diaphragm cells, the cathode structure has at least one but usually two cathode bus bar arms welded to it which are rectangular in shape, uniform in cross-section, and during electrolysis have a relatively high current density at the end connected to the inner-cell conductor, and a relatively low current density on the other end. Therefore, these members also have resulted in higher capital costs without concomitant reduction in power costs.

When a cell needs to be shut down or removed for renewal, a jumpering switch has been used to by-pass the current around the cell. This has been done by connecting the switch on one side of the first cell to a lug on its jumper bar, and on the other side to a metallic lug, attached to the cathode of the next adjacent cell.

This jumper bar on the inter-cell connecting means is effectively used only during the period of renewal or shutdown, which amounts to less than ten hours a year. The bar is heavy, unwieldy, difficult to handle and requires special welding, machining in its fabrication, specially fabricated auxiliary clamps and other parts. It also requires periodic cleaning and tinning to insure proper electrical connection.

Further, the two connection points between the cells have been located in positions which are difficult to reach by a workman standing in the aisle of the cell bank. In addition, the connecting parts were heavy and not self-supporting. This required special equipment and techniques to hold in place the conducting units and auxiliary components in order to assemble or disconnect them.

Therefore, it is the object of this invention to provide a current-carrying bus bar structure in deposited diaphragm electrolytic cells for the electrolysis of alkali metal hydroxide brine having a vertical anode positioned and electrically connected to the base of the cell and having a vertical cathode structure electrically connected to a side of the cell for carrying the desired operating current, which requires substantially less conducting metal, yet without causing an increase in voltage drop and attendant increase in power costs.

It is a further object of this invention to provide an over-all bus bar design which gives a shorter and more direct path for current flow from cell to cell.

It is a further object of this invention to provide for the elimination of the jumper bar between adjacent cells.

It is a further object of this invention to substantially reduce the amount of conductor metal used in the bus bar system for carrying the current from cell to cell, without increasing the voltage drop or heat losses.

It is a further object of this invention to provide an improved bus bar structure for the said electrolytic cell which has a lower voltage drop, and yet reduces the investment costs of the conducting metal and its fabrication.

It is a further object of this invention to reduce the number of bus bar electrical conductors between cells and reduce the number of bolts and clamps for the unions.

It is a further object of this invention to improve the ease of handling of those components which still require manual lifting in the assembly or renewal of a cell.

It is a further object of this invention to provide an inter-cell connecting means for carrying current from one cell to another which can accommodate for horizontal and vertical alignment of the cells.

It is a further object of this invention to provide a means of connecting the bus bar members of one cell to those of another cell in electrical series wherein the more heavy components are self-supporting while they are being manually connected.

It is a further object of this invention to provide a means of connecting and disconnecting a cell without shutting down the balance of the cell circuit.

It is a further object of this invention to provide an apparatus wherein the connecting points are positioned in such a manner that they are easily accessible for manual connection or disconnection.

These and other related objects are accomplished by the inter-cell current-carrying apparatus of this invention which comprises:

(1) Eliminating the jumper bar;

(2) Providing an anode bus bar embedded in the cell base and having inter-cell connection means extending out from the cell, with the embedded portion of said anode bus bar being aligned and in electrical communication with the anode overhead and adapted to carry a uniform current density by having a diminishing cross-section as it extends away from the said inter-cell connecton means; and (3) Providing an essentially L-shaped inter-cell connection means being adapted to detachably connect the said anode bus bar inter-cell connecting means of one of said cells with the said cathode bus bar inter-cell connecting means of another of said cells and adapted to allow for horizontal and vertical alignment of the cell with the next adjacent cell.

It is preferred to also provide the cell with a cathode bus bar attached to at least one of the sidewalls to which the cathode fingers are attached in the cathode structure, said cathode bus bar means having inter-cell connection means extending out from said cell and adapted to receive inter-cell connecting means for passing current between an adjacent cell, with the attached portion of said cathode bus bar being aligned and in electrical communication with the said cathode and adapted to carry a uniform current density by having a diminishing cross-section as it extends away from the said inter-cell connection means, although in some designs this is not essential.

Instead of having the cells inter-connected by a jumper bar, each cell is provided with preferably two inter-cell connecting points near its outside corners and is connected by essentially L-shaped members which allow for movement due to expansion and accommodate for horizontal and vertical alignment. The members can be of metal fabricated in flexible form, or can be L-shaped metal plates having oversize slots in each face of the plates. The cells are connected through the slots by clamping means.

The above improvements are confirmed by the further finding that to make the most economic use of invested capital (e.g., copper bus), the rate of return on the investment can be determined by a balancing of the power losses in the copper bus against the invested cost of the copper. In the deposited diaphragm type cells of the Hooker type it has been found that the most economic use of copper bus results when the above-enumerated improvements are incorporated in the cell.

As a result of the above invention, at least the following results have been accomplished.

The jumper bar, with its associated costs has been eliminated. Similarly, the cathode lug, used in conjunction with the jumper bar, has also been eliminated. The amount of conductor metal necessary for the inter-cell connections has been reduced. Further, this novel structure reduces the amount of metal in the bus bar structures attached to the cathode and embedded in the anode by making use of a triangular shape. The total weight reduction of metal to be used in the novel bus bar is at least thirty-five percent less than that used previously.

In addition, the bolts and clamps and auxiliary parts which had to be specially fabricated, have been reduced in number, and it is no longer necessary for a workman to manually lift heavy parts to connect or disconnect a cell from the circuit. Now the heavier parts are either directly attached to the cell and the remaining lighter weight parts which need to be connected can be handled easily from the aisle. Additionally, the L-shaped inter-cell conductors are smaller, lighter in weight and slotted in each face to allow for vertical and horizontal alignment.

Further, this current-carrying apparatus is so constructed that the current flow from the anode to the cathode is shorter in distance, more direct, i.e., has fewer turns, and passes through fewer junctions than in the prior construction.

In addition, the method of removing a cell for a renewal, including the jumpering or by-passing of the current around the cell which is being renewed, has been simplified and made easier by using the novel current conducting structure of this invention. Now, when by-passing a cell, the inter-cell conductors nearest the jumper switch are removed while the total circuit current is passed through the two remaining inter-cell conductors, that is, the anode conductor of one cell and the cathode conductor of the adjacent cell, to which it is electrically in communication through the remaining L-shaped intercell connection means. The jumper switch is connected to the points made free by the removal of the said L-shaped conductors and the jumper switch is closed so that the current is by-passed through the switch around the cell being renewed. The two remaining inter-cell conductors on the side of the cell away from the switch are next disconnected and the cell is then free to be removed from the circuit. This process is reversed after a cell with a new anode or diaphragm has been installed in the position from which the cell was removed.

As a result of this novel inter-cell connection means, a by-pass switch can be used which is simpler in construction and easier to connect and disconnect.

I have also found that the average voltage drop from cell to cell of a typical Hooker S-3B cell has been reduced on the average of about 0.025 volt at 30,000 amperes.

Figure 3:
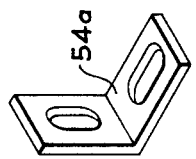
Figure 2:
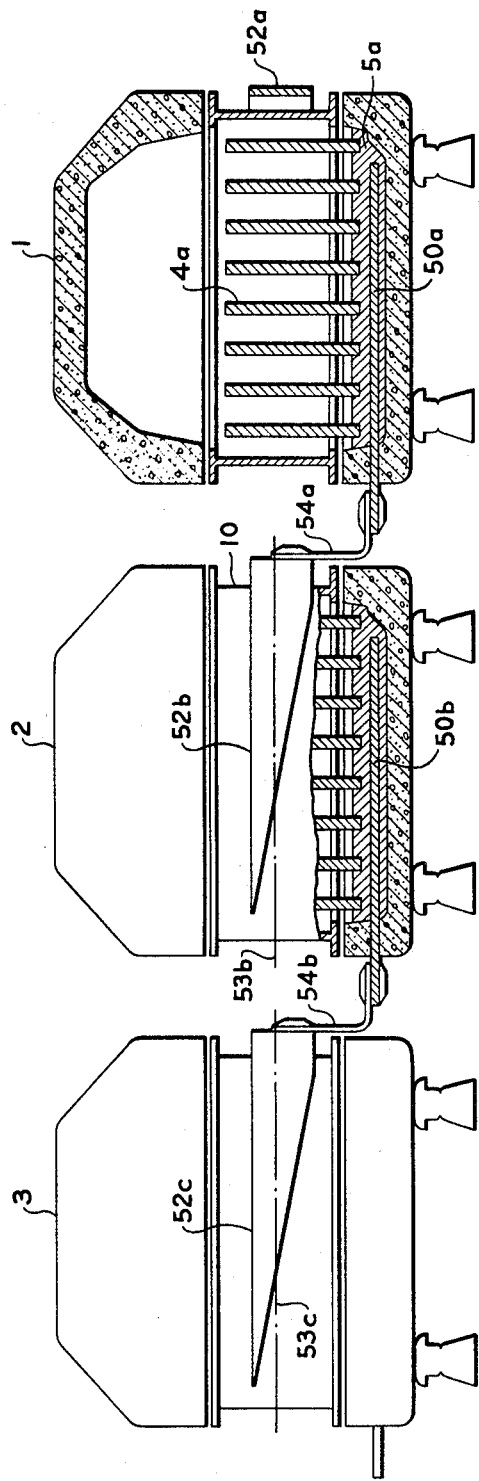
Figure 4:
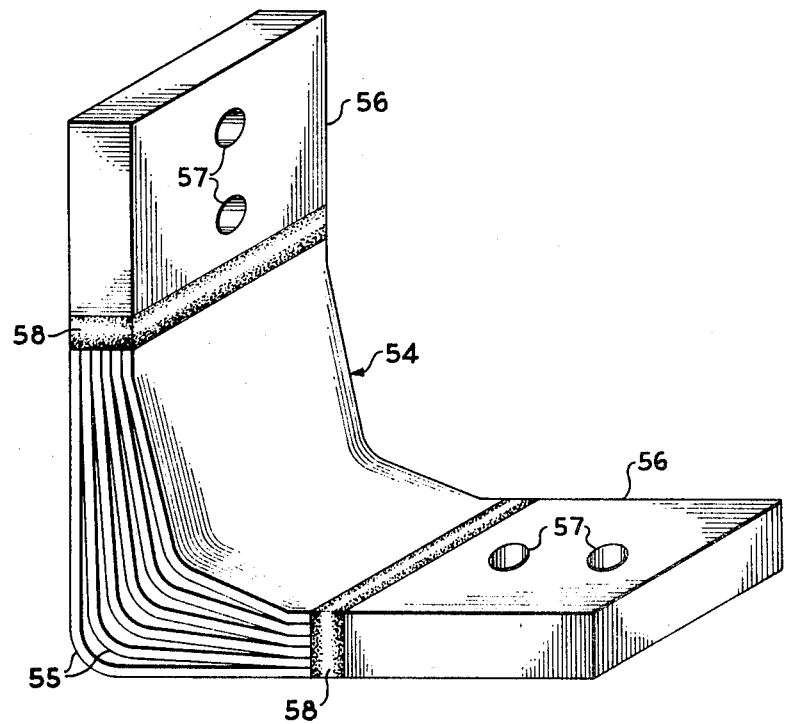

This invention is additionally illustrated by FIGURES 1, 2, 3 and 4 which show the preferred embodiment of my invention. FIGURE 1 shows the plan view of the three deposited diaphragm type electrolytic cells 1, 2 and 3 connected in series. FIGURE 2 shows a front view of the same three cells. FIGURE 3 shows the L-shaped inter-cell conductor member. FIGURE 4 shows another embodiment of an L-shaped inter-cell connection member.

In cell 1 of FIGURE 1, each of the two substantially parallel anode bus bars 50a embedded in the base of cell 1 and in electrical communication with anode members 4a is triangular in shape and aligned with the center line 51a of the anode members 4a. As a preferred embodiment, in order to have the inter-cell connection point aligned with the anode bus bar and nearer the outer edge of the cell, the portion of the anode bus bar embedded in the base of the cell is shaped approximately or essentially as a right angle triangle having its right angle near the inter-cell connection point and nearest the center of the base of the anode structure. Alternatively, the right angle near the inter-cell connection point can be nearest the outside of the cell base (away from the center).

Similarly, as shown in cell 2 of FIGURE 2, each of the two cathode bus bars 52b, attached to the opposite sides of the cathode structure 10 of the cell and in electrical communication with the cathode members 11, is triangular in shape and aligned with the center line 53b of the cathode members 11. As a preferred embodiment, in order to have the inter-cell connection point be close to the anode bus bar, the portion of the cathode bus bar which is triangular, is shaped approximately as a right angle triangle having its right angle near the inter-cell connection point and nearest the top of the cathode structure 10.

I prefer to have the portions of the anode and cathode conductor bars shaped as a right angle triangle, for this configuration permits the maximum saving (utilization) of conductor metal and the least distance for current flow; however, other triangular shapes can also be used and I do not want to be limited to same. In addition, it is preferred to have the apex of the extreme end of the anode and cathode bus bars truncated in order to avoid the possibility of over heating, and the like, due to electrical current malfunctioning at the apex.

Thus, in this specific embodiment, by the use of a right angle triangular shaped anode bus bar having its right angle near the inter-cell connection means and toward the center of the cell base, and by the use of a right angle triangular shaped cathode bus bar having its right angle near the inter-cell connection point and toward the top of the cathode, the distance in conductor metal for the electric current to travel between the anode bus bar and the cathode bus bar is reduced to a minimum. This results in savings in conductor metal and voltage drop losses.

As shown in FIGURES 1 and 2, each anode bus bar is aligned along the center line 51a of each anode bank so that equal areas of bus bar are on either side of the center line 51a of the anode bank. This gives a more uniform current distribution into the anode blades. Alternatively, the right angle edge of each anode bus bar can be aligned along the center line of each cell bank with the bus bar being positioned more toward the outside edge of the cell from which additional savings in metal and voltage drop may be realized therefrom. One example of this would be to position the outside edge of the anode bus bar to be in line with the outside edge of the bank of anodes. Another example would be to position the outside edge of the anode bus bar to be in line with the center line of the anode bank.

Similarly, as shown in FIGURE 2, each cathode bus bar is aligned along center line 53b of the cathode structure so that equal areas of bus bar are on either side of the center line 53b. Likewise, this gives a more uniform current distribution into the cathode fingers. Alternatively, the right angle edge of each cathode bus bar can be aligned along the center line of the cathode structure, such that the bus bar is positioned more toward the bottom of the cathode structure, from which additional savings in metal and voltage drop may be realized therefrom. One example of this would be to position the bottom-most part of the cathode bus bar to be in line with the bottom edge of the cathode fingers. Another example would be to position the upper-most part of the cathode bus bar to be in line with the center line of the cathode structure.

Although it is preferred to provide the cell with both anode and cathode bus bar means of diminishing cross-sectional area, it is to be understood the cell can be provided with just one of these means. In particular, the cell can be provided with its bus bar means being of diminishing cross-sectional area.

The inter-cell connection means between cells is much simpler as shown in FIGURES 1, 2, 3 and 4. The anode bus bar 50a is simply clamped to an L-shaped conductor 54a, which in turn is clamped to the cathode bus bar 52b. As shown in FIGURE 3, the L-shaped conductor 54a is slotted with oversize holes in each face to allow for vertical and horizontal alignment. As shown in FIGURE 4, the L-shaped inter-cell connection means 54 can be adapted to flexibility to allow for vertical and horizontal adjustment, by providing laminated, flexible L-shaped or angled strips 55 of copper connected, such as by welding 58 with copper attachment means 56. The holes 57 for attaching to the bus bars can be oversize if desired. Other L-shaped adjustable inter-cell connection means may also be used.

In addition, since the jumper bar itself has been eliminated, a considerable reduction in metal investment and fabrication can be realized. Further, the L-shaped conductors can be lighter in weight for a given current density capacity. In FIGURES 1 and 2, two L-shaped conductors are shown connecting each anode bus bar to the adjacent cathode bus bar. This is preferred because each of the L-shaped members is lighter in weight and in this size has a slight price advantage over a single-but-heavier member. The smaller pieces are easier to handle and enable better electrical contact at the junction points.

In addition, with my new current conducting apparatus, substantially the same jumpering switch equipment can be used to by-pass a cell in a circuit for renewal, and the like. However, heavy copper lug on the cathode bus bar, and heavy copper lug on the jumper bar, are no longer needed. Now to by-pass a cell, the L-shaped members are successively disconnected and used as junction points for the jumper switch areas, and a given cell can be removed from the circuit without shutting down the balance of the cell circuit. Further, the inter-cell connection points are located considerably closer to the outer edges of the cell, and fewer parts are needed for connection, or disconnection, so that the manual labor involved has been made simpler, safer and substantially reduced. In addition, my new current-carrying apparatus has fewer electrical junction points and the electrical path is shorter and more direct so that substantial savings in voltage drop losses are realized.

Although I have illustrated my invention by means of comparing it with a commercial electrolytic cell known in the art as a Hooker 3B cell, I do not wish to be limited to same, for it is clear to one of ordinary skill in this art that the invention also applies to other electrolytic cells having a vertical anode positioned and electrically connected to the base of the cell and having a vertical cathode electrically connected to a side of the cell.

Various modifications and variations can be made to the above description by one of ordinary skill in this art without departing from the scope of this invention.

I claim:
1. In a deposited diaphragm-type electrolytic cell for the electrolysis of alkali metal chloride brine having
    (A) disposed at the bottom of the cell a lead matrix from which spaced, vertical anodes extend into the interior of said cell and from which an embedded copper anode bus bar extends to the exterior of one side of said cell,
    (B) disposed from the sides of said cell a cathode structure which has vertical fingers extending into the interior of the cell between the vertical anodes, said fingers being attached to and supported internally by members extending from the sidewall through the length of each finger to provide electrical communication to the cathode structure from a copper bus bar attached to at least one sidewall of said cell, and (C) inter-cell connecting bus bars adapted to connect the copper anode bus bar of one cell and the copper cathode bus bar of an adjacent cell, the improvement which comprises diminishing the cross-section of each copper anode bus bar as it extends away from said inter-cell connecting bus bars, to form essentially a truncated right angle triangle as the effective conductive area for the anode blades within the cell, each anode bus bar being aligned centrally on a bank of anode blades and having a plurality of attachment means for inter-cell connecting bus bars.

2. The deposited diaphragm-type electrolytic cell of claim 1 which has the additional improvement in the means for conducting electrical current, wherein that part of the copper bus bar means attached to the sidewall of said cathode structure has a diminishing cross-section of essentially a truncated right angle triangle as it extends away from its said inter-cell connection means.

3. The deposited diaphragm-type electrolytic cell of claim 1 in which the inter-cell connecting bus bars are substantially L-shaped and adapted to be detachably connected to the cathode bus bar of one cell and the anode bus bar of an adjacent cell, said L-shaped inter-cell connecting bus bars being adapted for vertical and horizontal alignment of adjacent cells through slotted clamping means.

References Cited

UNITED STATES PATENTS

| 1,035,133 | 8/1912 | Allen | 204—266 |
| 1,368,206 | 2/1921 | Burdett | 204—253 |
| 1,534,315 | 4/1925 | Hoopes | 204—245 |
| 1,555,424 | 9/1925 | Luening | 204—258 |
| 2,987,463 | 6/1961 | Baker et al. | 204—266 |

JOHN H. MACK, *Primary Examiner.*

D. R. JORDAN, *Assistant Examiner.*

U.S. Cl. X.R.

204—266, 279